US012619017B2

(12) United States Patent
Yu et al.

(10) Patent No.: US 12,619,017 B2
(45) Date of Patent: May 5, 2026

(54) OPTICAL FILTER AND METHOD OF PRODUCING THE SAME

(71) Applicant: APOGEE OPTOCOM CO., LTD.,
Tainan City (TW)

(72) Inventors: Chi-Ming Yu, Tainan City (TW); Zong Han Li, Tainan City (TW); Chin-Pin Yeh, Tainan City (TW)

(73) Assignee: APOGEE OPTOCOM CO., LTD.,
Tainan City (TW)

( * ) Notice: Subject to any disclaimer, the term of this patent is extended or adjusted under 35 U.S.C. 154(b) by 293 days.

(21) Appl. No.: 18/373,220

(22) Filed: Sep. 26, 2023

(65) Prior Publication Data
US 2024/0103209 A1     Mar. 28, 2024

(30) Foreign Application Priority Data

Sep. 27, 2022    (TW) ................................. 111136443

(51) Int. Cl.
*G02B 5/28*          (2006.01)

(52) U.S. Cl.
CPC ..................................... *G02B 5/28* (2013.01)

(58) Field of Classification Search
CPC .......... G02B 5/28; G02B 5/285; G02B 5/281; G02B 5/08; G02B 5/0833; G02B 1/115; H01L 21/76828; H01L 21/7684; H01L 21/3212; H01L 21/0223; H01L 27/1157; H01L 27/11582

USPC ....... 359/580, 359, 885, 584, 586, 588, 589, 359/484.09, 489.19, 491.01; 438/634, 438/637, 633, 631
See application file for complete search history.

(56) References Cited

U.S. PATENT DOCUMENTS

2004/0175922 A1 *   9/2004   Solomentsev ...... H01L 21/7684
                                                              438/622
2022/0310648 A1 *   9/2022   Du ........................ H10B 41/35

FOREIGN PATENT DOCUMENTS

TW          202109874 A        3/2021
TW          202224216 A        6/2022

* cited by examiner

*Primary Examiner* — Jie Lei
(74) *Attorney, Agent, or Firm* — CKC & Partners Co., LLC

(57) ABSTRACT

The present disclosure relates to an optical filter and a method of producing the same. In the producing method, a thermal evaporation deposition process of a sacrificial layer, and depositions process of a base layer and a dielectric stack layer are sequentially performed on a substrate having a trench with a specific width, so that the base layer and the dielectric stack layer extend outward to form a solidified structure with a specific length. Next, a fixed layer is affixed to the dielectric stack layer, and the sacrificial layer is removed using a solvent to remove the substrate. As such, structural strength and flatness of the produced optical filter are enhanced, and a volume thereof is reduced, such that the optical filter can be applied to automated processes of miniaturized elements.

12 Claims, 10 Drawing Sheets

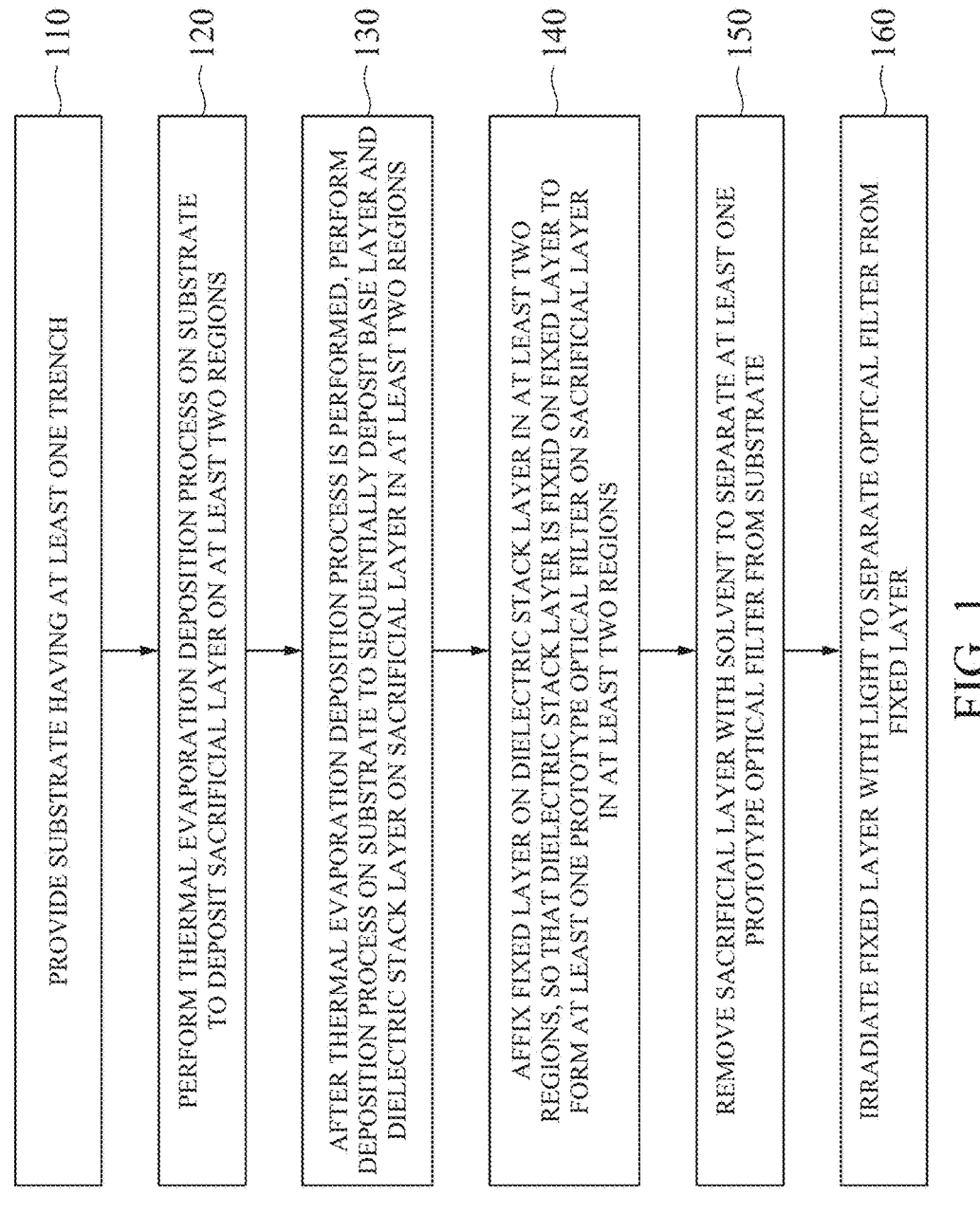

110

PROVIDE SUBSTRATE HAVING AT LEAST ONE TRENCH

120

PERFORM THERMAL EVAPORATION DEPOSITION PROCESS ON SUBSTRATE TO DEPOSIT SACRIFICIAL LAYER ON AT LEAST TWO REGIONS

130

AFTER THERMAL EVAPORATION DEPOSITION PROCESS IS PERFORMED, PERFORM DEPOSITION PROCESS ON SUBSTRATE TO SEQUENTIALLY DEPOSIT BASE LAYER AND DIELECTRIC STACK LAYER ON SACRIFICIAL LAYER IN AT LEAST TWO REGIONS

140

AFFIX FIXED LAYER ON DIELECTRIC STACK LAYER IN AT LEAST TWO REGIONS, SO THAT DIELECTRIC STACK LAYER IS FIXED ON FIXED LAYER TO FORM AT LEAST ONE PROTOTYPE OPTICAL FILTER ON SACRIFICIAL LAYER IN AT LEAST TWO REGIONS

150

REMOVE SACRIFICIAL LAYER WITH SOLVENT TO SEPARATE AT LEAST ONE PROTOTYPE OPTICAL FILTER FROM SUBSTRATE

160

IRRADIATE FIXED LAYER WITH LIGHT TO SEPARATE OPTICAL FILTER FROM FIXED LAYER

OPTICAL FILTER AND METHOD OF PRODUCING THE SAME

RELATED APPLICATION

This application claims priority to Taiwan Application Serial Number 111136443, filed Sep. 27, 2022, which is herein incorporated by reference.

BACKGROUND

Field of Invention

The present disclosure relates to an optical filter and a method of producing the same, and in particular to a substrate-free optical filter having a solidified structure and a method of producing the same.

Description of Related Art

Traditionally, a method of producing an optical filter made of a dielectric material is to use a substrate as a base layer, and to deposit a dielectric stack layer on the substrate. This producing method utilizes the substrate to provide reinforcement to the weak dielectric stack layer to prevent damage during subsequent assembly processes such as clamping.

However, since a material of the dielectric stack layer and a material of the substrate are different, and producing processes of the two are also different, stress is generated between the dielectric stack layer and the substrate. The stress causes the optical filter to warp during the subsequent assembly processes (especially when the optical filter is bonded to an optical element such as a lens or a prism), which affects a yield of a finished product.

Generally, flatness of the dielectric stack layer is maintained by increasing a thickness of the substrate to more than several times a thickness of the dielectric stack layer. However, the thickened substrate also increases a volume of the optical filter, so that the optical filter cannot be bonded to a miniaturized optical element by transfer printing, so it is not suitable for automatic mass production of miniaturized elements.

In addition, with miniaturization of the optical element, there is a demand for reducing an area of the optical filter. Although a traditional cutting method can reduce the area of the optical filter, a cut portion of the optical filter is easy to be damaged. In view of this, there is an urgent need to develop a novel optical filter and a method of producing the same to improve the above shortcomings.

SUMMARY

In view of the above issues, one aspect of the present disclosure provides a method of producing an optical filter. The producing method utilizes a substrate having a trench with a specific width to form a solidified structure with a specific length, and removes the substrate by removing a sacrificial layer, so as to improve structural strength and flatness of the produced optical filter and reduce a volume thereof.

Another aspect of the present disclosure provides an optical filter. The optical filter is produced by the above-mentioned method.

According to one aspect of the present disclosure, a method of producing an optical filter is provided. In the producing method, a substrate having at least one trench is provided, in which a width of the at least one trench is not less than 0.1 mm, and the at least one trench divides the substrate into at least two regions. A thermal evaporation deposition process is performed on the substrate to deposit a sacrificial layer on the at least two regions. After performing the thermal evaporation deposition process, a deposition process is performed on the substrate to sequentially deposit a first base layer and a dielectric stack layer on the sacrificial layer in the at least two regions, in which the first base layer and the dielectric stack layer extend outward to form a solidified structure, and a length of the solidified structure is less than 15 μm. A fixed layer is affixed on the dielectric stack layer in the at least two regions, so that the dielectric stack layer is fixed on the fixed layer to form at least one prototype optical filter on the sacrificial layer in the at least two regions. The sacrificial layer is removed with a solvent to separate the at least one prototype optical filter from the substrate. The fixed layer is irradiated with light to separate the optical filter from the fixed layer.

According to one embodiment of the present disclosure, a depth of the at least one trench is not less than 0.1 mm.

According to another embodiment of the present disclosure, when performing the thermal evaporation deposition process, a temperature of the substrate is set at 140° C. to 160° C.

According to one embodiment of the present disclosure, the thermal evaporation deposition process is performed without using an ion beam.

According to one embodiment of the present disclosure, an included angle between a deposition direction of the thermal evaporation deposition process and a normal direction of a surface of the sacrificial layer is 10 degrees to 40 degrees.

According to a further embodiment of the present disclosure, the deposition process comprises an ion beam-assisted evaporation, and a voltage and a current of the ion beam-assisted evaporation are 500V to 700V and 500 mA to 700 mA, respectively.

According to one embodiment of the present disclosure, an included angle between a deposition direction of the deposition process and a normal direction of a surface of the first base layer is 10 degrees to 40 degrees.

According to one embodiment of the present disclosure, an included angle between a deposition direction of the deposition process and a normal direction of a surface of the dielectric stack layer is 10 degrees to 40 degrees.

According to a further embodiment of the present disclosure, the dielectric stack layer includes at least one first dielectric layer and at least one second dielectric layer alternately stacked with the at least one first dielectric layer. A first refractive index of the at least one first dielectric layer is not equal to a second refractive index of the at least one second dielectric layer.

According to a further embodiment of the present disclosure, a thickness of the first base layer is not less than 3 μm.

According to a further embodiment of the present disclosure, a material of the sacrificial layer includes a salt of hexafluoroaluminic acid, and the solvent includes water.

According to one embodiment of the present disclosure, before affixing the fixed layer on the dielectric stack layer, depositing a second base layer on the dielectric stack layer.

Another aspect of the present disclosure provides an optical filter. The optical filter includes a first base layer and a dielectric stack layer disposed on the first base layer. The first base layer and the dielectric stack layer extend outward to form a solidified structure, and a length of the solidified structure is less than 15 μm.

According to one embodiment of the present disclosure, the dielectric stack layer includes at least one first dielectric layer and at least one second dielectric layer alternately stacked with the at least one first dielectric layer. A first refractive index of the at least one first dielectric layer is not equal to a second refractive index of the at least one second dielectric layer.

According to one embodiment of the present disclosure, the first refractive index of the at least one first dielectric layer is 0.3 to 4.0 and the second refractive index of the at at least one second dielectric layer is 0.3 to 4.0.

According to one embodiment of the present disclosure, the first refractive index of the at least one first dielectric layer is less than the second refractive index of the at least one second dielectric layer.

According to a further embodiment of the present disclosure, the optical filter excludes a substrate.

According to one embodiment of the present disclosure, the optical filter further includes a second base layer disposed on the dielectric stack layer.

According to one embodiment of the present disclosure, a thickness of the first base layer is the same as a thickness of the second base layer.

According to one embodiment of the present disclosure, a material of the first base layer is the same as a material of the second base layer.

Applying the optical filter and the method of producing the same of the present disclosure, the thermal evaporation deposition process of the sacrificial layer, and the depositions of the base layer and the dielectric stack layer are sequentially performed on the substrate having the trench with the specific width, so that the base layer and the dielectric stack layer extend outward to form the solidified structure with the specific length. Next, the substrate is removed by removing the sacrificial layer. As such, structural strength and flatness of the produced optical filter are enhanced, and a volume thereof is reduced, such that it can be applied to automated processes of miniaturized elements.

BRIEF DESCRIPTION OF THE DRAWINGS

In order to have a more complete understanding of embodiments and their advantages of the present disclosure, please refer to the following description and cooperate with the corresponding drawings. It must be emphasized that various features are not drawn to scale and are for illustration purposes only. In the drawings, the same element symbols are used to denote the same elements or elements with the same function. The description of the drawings is explained as follows.

FIG. 1 is a flowchart illustrating a method of producing an optical filter according to an embodiment of the present disclosure.

DETAILED DESCRIPTION

The produce and use of embodiments of the present disclosure are discussed in detail below. However, it should be appreciated that the embodiments provide many applicable inventive concepts that can be embodied in a wide variety of specific contexts. The specific embodiments discussed are illustrative only and do not limit the scope of the present disclosure.

Terms such as "first" and "second" in the present disclosure are only used to distinguish one element (or property) (e.g., a layer, a refractive index and a thickness) from another, so the described element (or property) should not be limited by these terms. Then, spatially relative terms (e.g., "lower" and "upper") here are used to describe a relationship between one element (e.g., a layer) and another in a drawing. Thus, the spatially relative terms may encompass different orientations of a device (e.g., an optical filter) in use or operation in addition to the orientation depicted in drawings.

Figure 2:
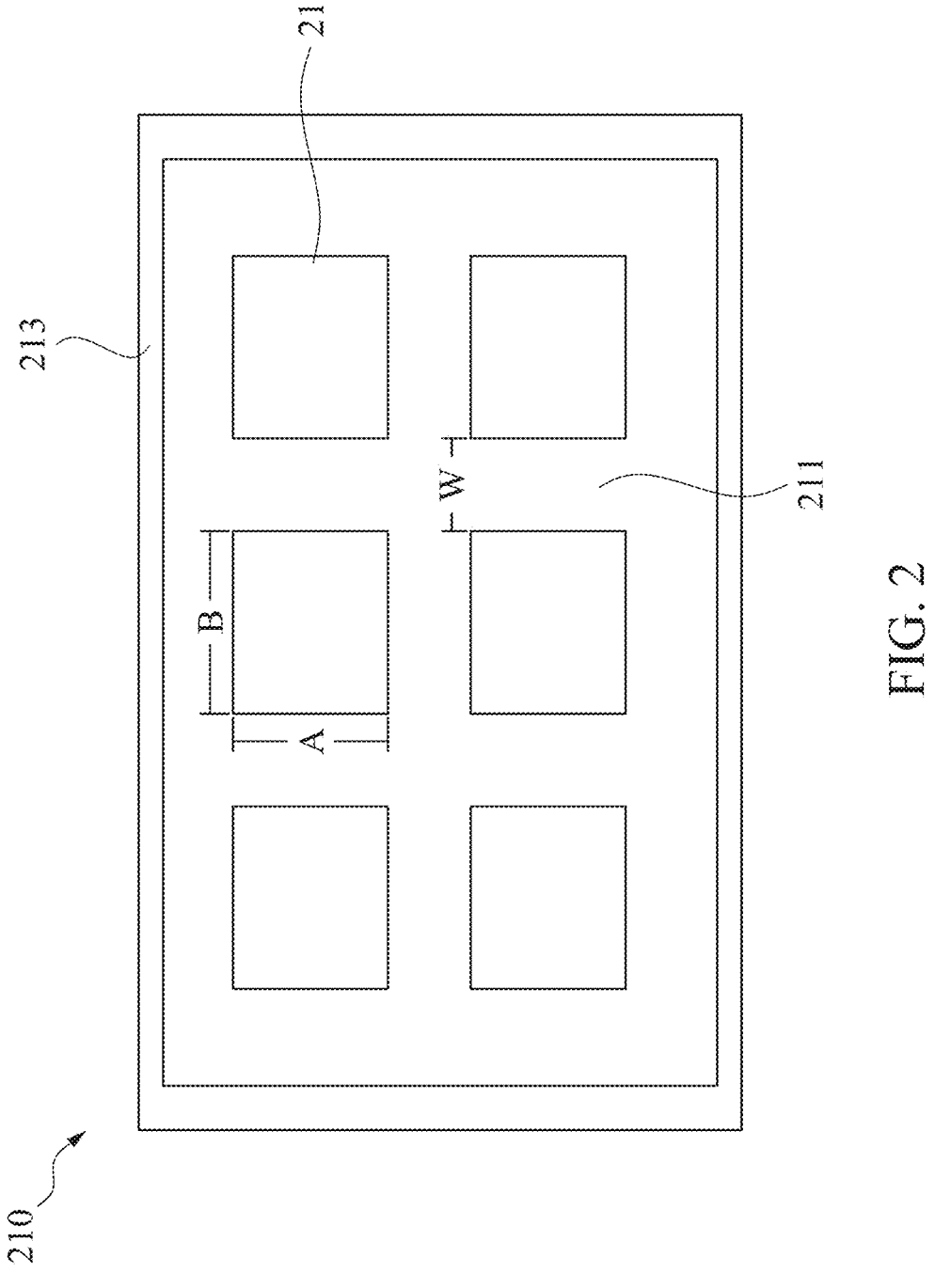
FIG. 2 is a schematic diagram illustrating a substrate used in a method of producing an optical filter according to an embodiment of the present disclosure.

Please refer to FIG. 1 and FIG. 2. A method 100 of producing an optical filter includes providing a substrate 210 having at least one trench 211, as shown in operation 110. In some embodiments, as shown in FIG. 2, the substrate 210 has a plurality of trenches 211. The trenches 211 are perpendicular to each other and divide the substrate 210 into a plurality of rectangular regions 212 and a peripheral region 213. Specifically, both a length A and a width B of the rectangular region 212 may be 0.1 mm to 10 mm. In other embodiments, a trench divides the substrate into two regions (not shown). For example, the trench is an annular trench, which divides the substrate into an inner region surrounded by the annular trench and an outer region not surrounded by the annular trench.

The width W of the trench is not less than 0.1 mm, and preferably 0.1 mm to 0.2 mm. If the width W of the trench 211 is less than 0.1 mm, adjacent solidified structures formed subsequently are too close to each other and connected together, so cutting must be performed to separate the two. The cutting will damage the solidified structures and thus reduce structure strength and flatness of the optical filter.

Figure 3:
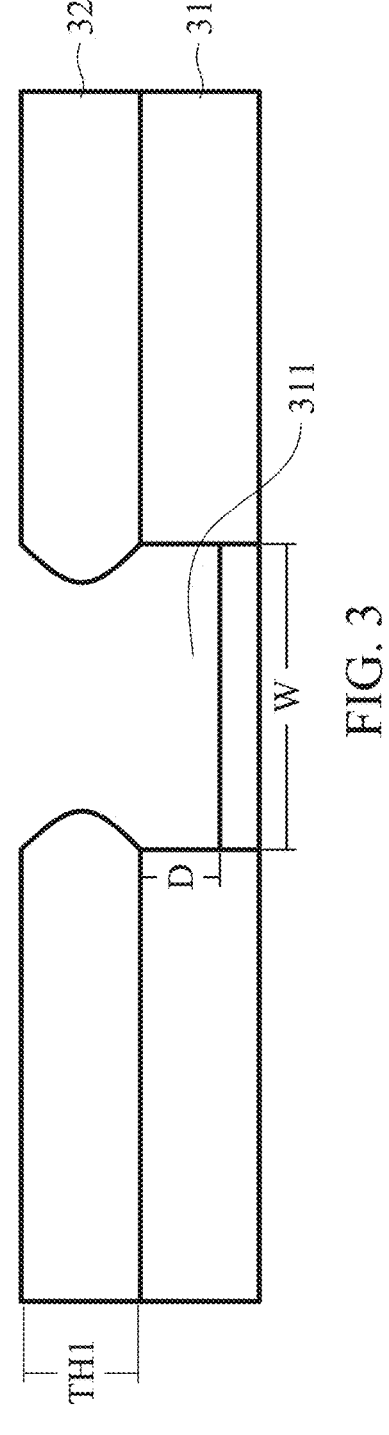
FIG. 3 is a cross-sectional view illustrating a stack of a substrate and a sacrificial layer during a producing process according to an embodiment of the present disclosure.

Please refer to FIG. 3. FIG. 3 shows a cross-sectional view of a stack 300 of a substrate 310 and a sacrificial layer 320 during a producing process of the producing method 100 according to an embodiment of the present disclosure. In this embodiment, a depth D of the trench 311 is not less than 0.1 mm, and preferably 0.1 mm to 0.4 mm. When the depth D of the trench 311 is in the aforementioned range, it is beneficial to formation of the solidified structure described later. Specifically, a cross-sectional shape of the trench 311 may be a rectangle, and preferably a rectangle with rounded corners.

Please refer to FIG. 1 and FIG. 3 again. After operation 110, a thermal evaporation deposition process is performed on the substrate 310 to deposit a sacrificial layer 320 on at least two regions, as shown in operation 120. In some embodiments, during the thermal evaporation deposition process, a temperature of the substrate 310 is set at 140° C. to 160° C., and use of an ion beam is excluded. If the sacrificial layer 320 is not formed by the thermal evaporation deposition process, the sacrificial layer 320 is not a plating layer with a loose structure, so it is not easy to be removed, and thus it is not easy to remove the substrate.

Specifically, a material of the sacrificial layer 320 is an easy-to-remove material to facilitate separation of a prototype optical filter described later from the substrate 310. Preferably, the material of the sacrificial layer 320 may be water-soluble to facilitate removal using water. In some embodiments, the material of the sacrificial layer 320 includes but not limited to a salt of hexafluoroaluminate, such as water-soluble sodium hexafluoroaluminate. In addition, a thickness TH1 of the sacrificial layer 320 may be 80 nm to 100 nm to facilitate removal. When the sacrificial layer 320 is easily removed, it is beneficial to remove the substrate 310, thereby improving the flatness of the optical filter and reducing a volume thereof.

The aforementioned "loose structure" refers to a structure in which a surface roughness of the sacrificial layer 320 measured by a white light interferometer is 0.25 nm to 0.30 nm. The loose structure is easily removable and not too fragile, so a base layer and other layers can be deposited thereon.

Figure 4:
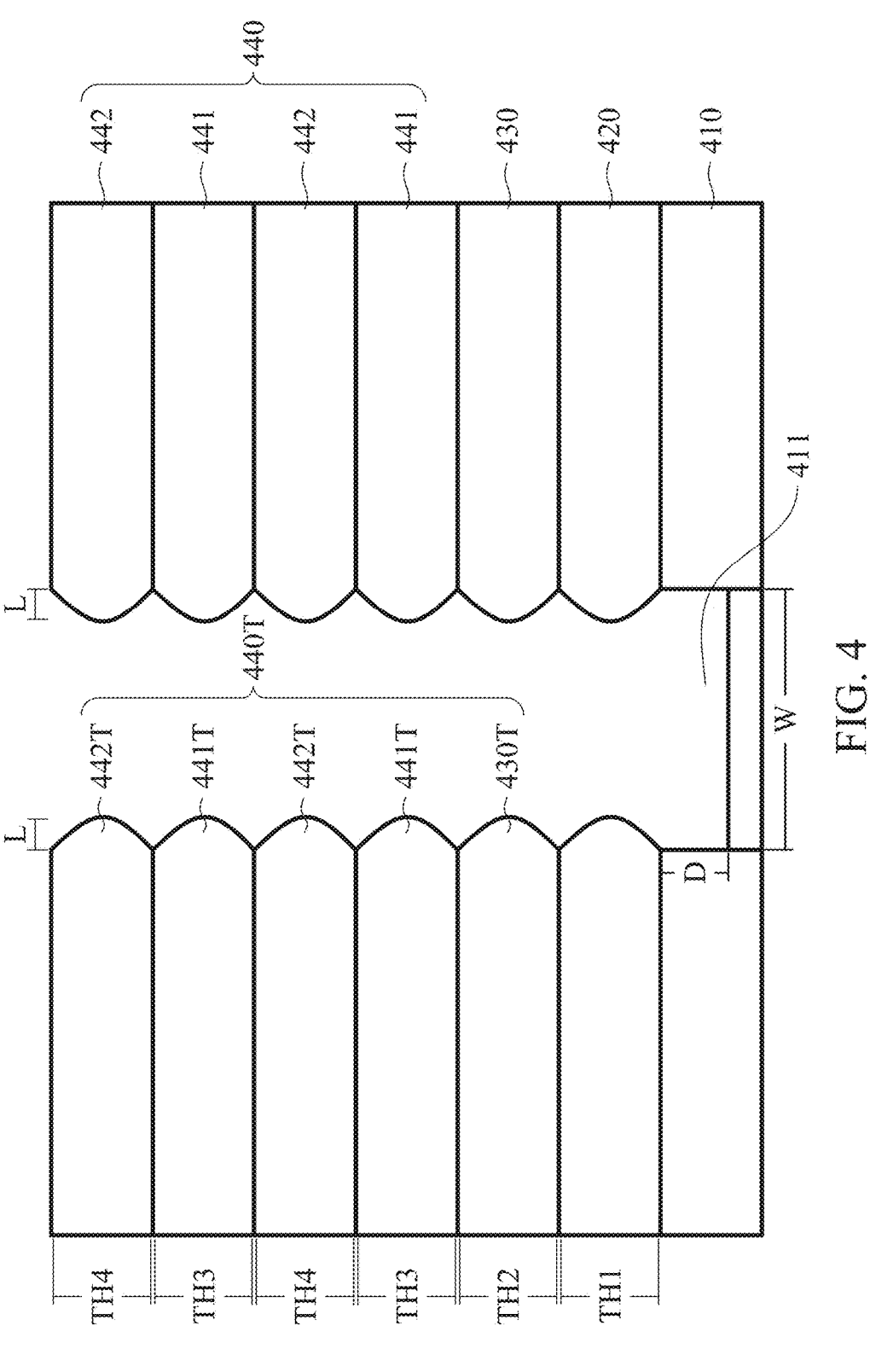
FIG. 4 is a cross-sectional view illustrating a stack of a substrate, a sacrificial layer, a base layer, and a dielectric stack layer during a producing process according to an embodiment of the present disclosure.

Please refer to FIG. 4. After operation 120, after the thermal evaporation deposition process is performed, a deposition process is performed on the substrate 410 to sequentially deposit a base layer 430 and a dielectric stack layer 440 on the sacrificial layer 420 in the at least two regions, as shown in operation 130.

In some embodiments, the deposition process may utilize an ion-beam assisted deposition (IAD). Specifically, conditions of the IAD may be a voltage of 500V to 700V and a current of 500 mA to 700 mA. When the above-mentioned conditions are used for the deposition process, structural uniformity of the plating layers (i.e., the base layer 430 and the dielectric stack layer 440) is improved to improve the flatness of the optical filter. In some specific examples, an included angle between a deposition direction and a normal direction of a surface of an object to be plated (e.g., the sacrificial layer 420, the base layer 430, and the dielectric layers 441 and 442 in the dielectric stack layer 440) may be 10 degrees to 40 degrees to facilitate formation of the solidified structure described later.

Specifically, the trench 411 divides the substrate 410 into discontinuous regions. During the depositions of the base layer 430 and the dielectric stack layer 440, materials of the base layer 430 and dielectric stack layer 440 are over-deposited (e.g., over-plated) above a top of the trench 411, so that the base layer 430 and the dielectric stack layer 440 that are originally adjacent but not interacting are extended outward by overflow deposition to form protrusions 430T, 441T, and 442T, and adjacent two layers at edges of the region (corresponding to a location above the trench 411) are mixed together to form a solidified structure 440T, thereby enhancing connectivity between each other. The connectivity between the base layer 430 and the dielectric stack layer 440 and that between the dielectric layers 441 and 442 in the dielectric stack layer 440 are enhanced to protect the base layer 430 and the dielectric stack layer 440 regularly stacked over the regions to resist damage caused by external force (e.g., external force applied by clamping in subsequent assembly processes).

In some embodiments, a material of the base layer 430 may include a dielectric material, which is the same as a dielectric material in the dielectric stack layer 440, or selected according to a required spectrum. A specific material may include, but is not limited to, silicon dioxide. In addition, a thickness TH2 of the base layer 430 may not be less than 3 μm, and is preferably 3 μm to 6 μm. When the sacrificial layer 420 is subsequently removed, the base layer 430 having the thickness TH2 may be easily separated from the substrate 410 while retaining its structural integrity.

For example, the dielectric stack layer 440 includes a first dielectric layer 441 and a second dielectric layer 442. The dielectric layers 441 and 442 are stacked alternately to reduce stress inside the optical filter, thereby improving the flatness of the optical filter. Preferably, thicknesses TH3 and TH4 and materials of the first dielectric layer 441 and the second dielectric layer 442 are the same to reduce the stress inside the optical filter. In some specific examples, the thickness of the dielectric stack layer 440 is determined according to a required spectrum, and the thickness TH3 and the number of the first dielectric layer 441 and the thickness TH4 and the number of the second dielectric layer 442 are adjusted accordingly. The specific thickness of the dielectric stack layer 440 may be, for example, 25 nm to 40 nm, but is not limited thereto.

In some embodiments, the first dielectric layer 441 and the second dielectric layer 442 respectively have a first refractive index and a second refractive index, which are not equal. The unequal refractive indices are used to improve a filtering effect of the optical filter for light with unwanted wavelengths. The first refractive index and the second refractive index may be determined according to a required spectrum, and materials of the first dielectric layer 441 and the second dielectric layer 442 may be adjusted accordingly, which may include but not limited to dielectric materials of silicon dioxide and tantalum pentoxide, and the refractive indices of the first dielectric layer 441 and the second dielectric layer 442 may be 0.3 to 4.0.

Please refer to FIG. 4 again. A length L of the solidified structure 440T is defined as a longest length of the solidified structure 440T measured in a direction parallel to the width W of the trench 411 based on an inner wall of the trench 411 as a starting point of the solidified structure 440T. For example, when the longest length of the solidified structure 440T appears at the protrusion 442T, the length measured in the direction parallel to the width W of the trench 411 with the protrusion 442T based on the inner wall of the trench 411 as the starting point is taken as the length L of the solidified structure 440T. The length L of solidified structure 440T is less than 15 μm. If the length L of the solidified structure 440T is not less than 15 μm, two adjacent solidified structures 440T are connected together, so cutting must be performed, which will damage the solidified structures 440T, thus reducing the structural strength and the flatness of the optical filter, or two adjacent solidified structures 440T are too close, thus reducing the flatness of the optical filter. Preferably, the length L may be greater than 0.1 μm and less than 15 μm.

Figure 5:
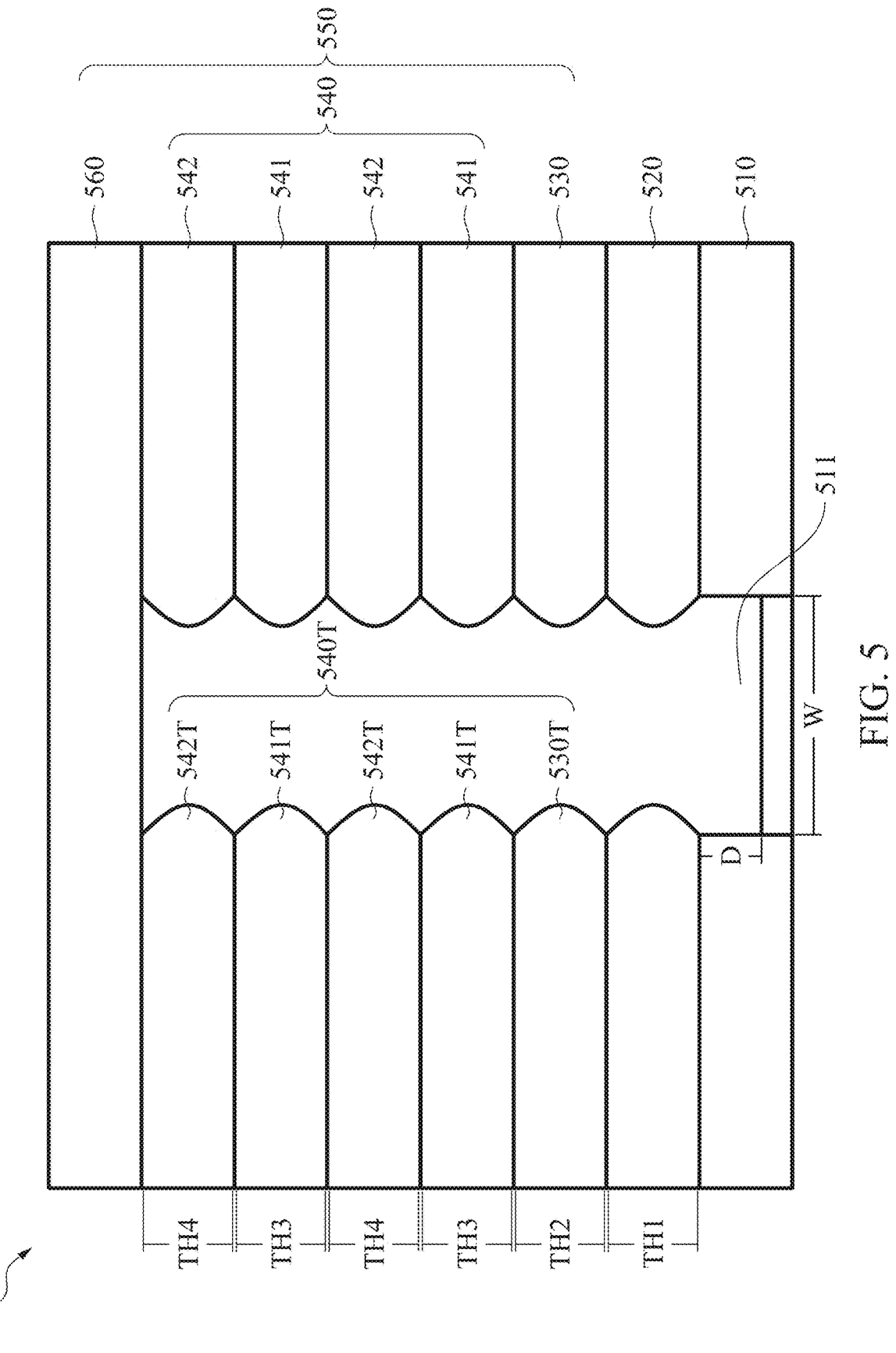
FIG. 5 is a cross-sectional view illustrating a stack of a substrate, a sacrificial layer, a base layer, a dielectric stack layer, and a fixed layer during a producing process according to an embodiment of the present disclosure.

Please refer to FIG. 1 and FIG. 5, after operation 130, a fixed layer 560 is affixed on the dielectric stack layer 540 in the at least two regions, so that the dielectric stack layer 540 is fixed on the fixed layer 560 to form at least one prototype optical filter 550 on the sacrificial layer 520 in the at least two regions, as shown in operation 140. The prototype optical filter 550 includes the fixed layer 560, the dielectric stack layer 540 and the base layer 530, in which the dielectric stack layer 540 is located between the base layer 530 and the fixed layer 560. If the aforementioned fixation is not performed, after the sacrificial layer 520 is subsequently removed, the prototype optical filters 550 separated from the substrate 510 are separated and difficult to recycle.

In some embodiments, the fixed layer 560 includes an adhesive film and a base material. A material of the adhesive film may include a photolytic viscous adhesive, such as ultraviolet adhesive, and a specific example may be an acrylic-based ultraviolet adhesive. The "photolytic viscous adhesive" refers to an adhesive whose adhesive force is reduced when irradiated with light having a specific wavelength. The reduction in adhesion is due to decrease in viscosity of the adhesive after exposure to light. The specific wavelength may include, but is not limited to, 200 nm to 400 nm. Therefore, the fixed layer 560 can fix the prototype optical filter 550 through the adhesive film and release it after being irradiated with the specific wavelength. Secondly, a material of the base material may be a flexible material commonly used by those skilled in the art of the present disclosure, such as polyvinyl chloride polymer, and the fixed layer 560 may be a photolytic adhesive tape. When the base material of the fixed layer 560 is the flexible material and the adhesive film has photolytic viscosity, the fixed layer 560 can fix the dielectric stack layer 540 and the base layer 530 to facilitate subsequent transfer printing and bonding of the optical filter to the miniaturized element.

Figure 6:
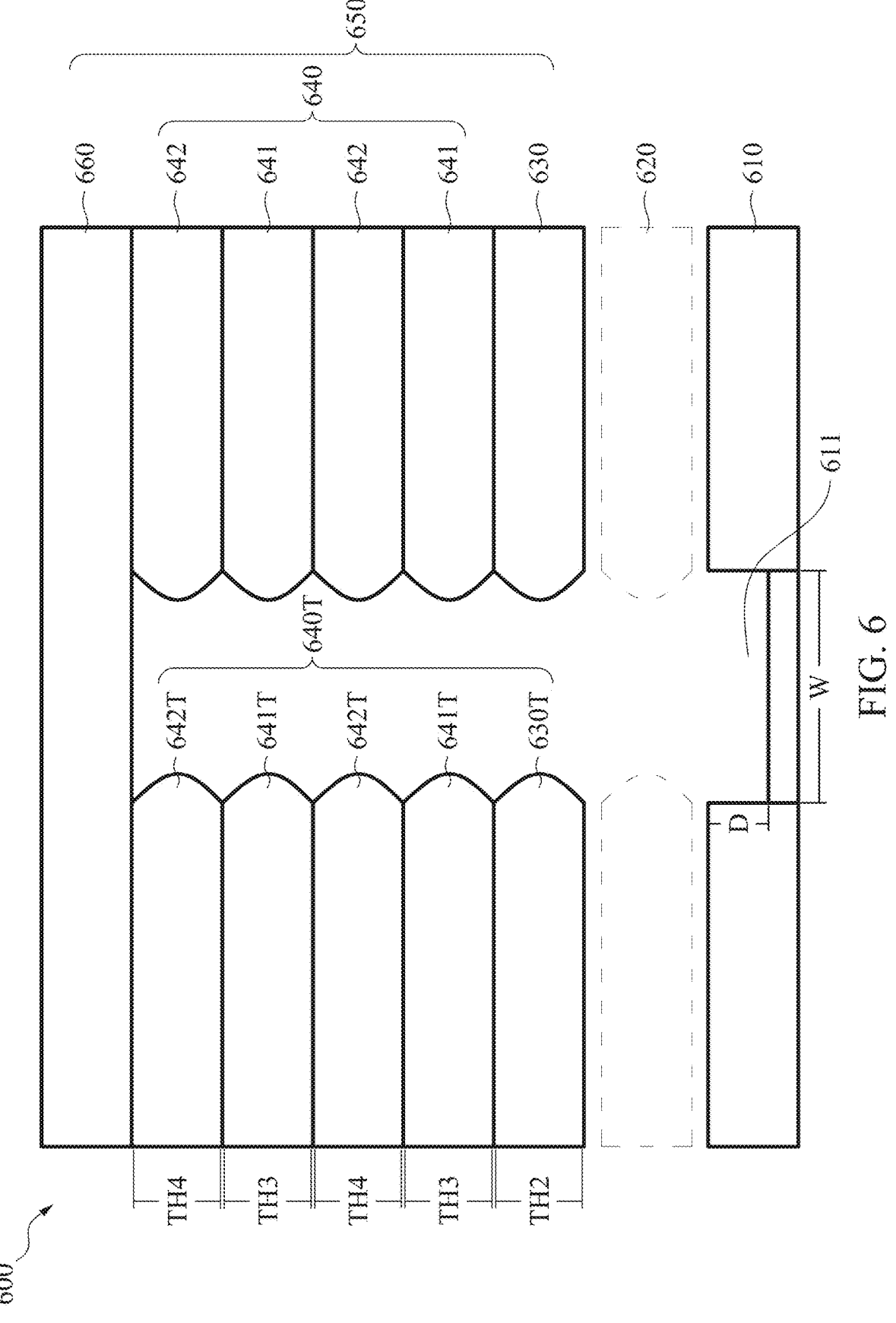
FIG. 6 is a schematic diagram illustrating removal of a sacrificial layer during a producing process according to an embodiment of the present disclosure.

Referring to FIG. 1 and FIG. 6, after operation 140, the sacrificial layer 620 is removed with a solvent to separate at least one prototype optical filter 650 from the substrate 610, as shown in operation 150. As mentioned above, since the sacrificial layer 620 has the loose structure and is soluble in the solvent, it can be removed by the solvent. If the sacrificial layer 620 is not removed, the substrate 610 cannot be removed, that is, the volume of the optical filter cannot be reduced.

Figure 7:
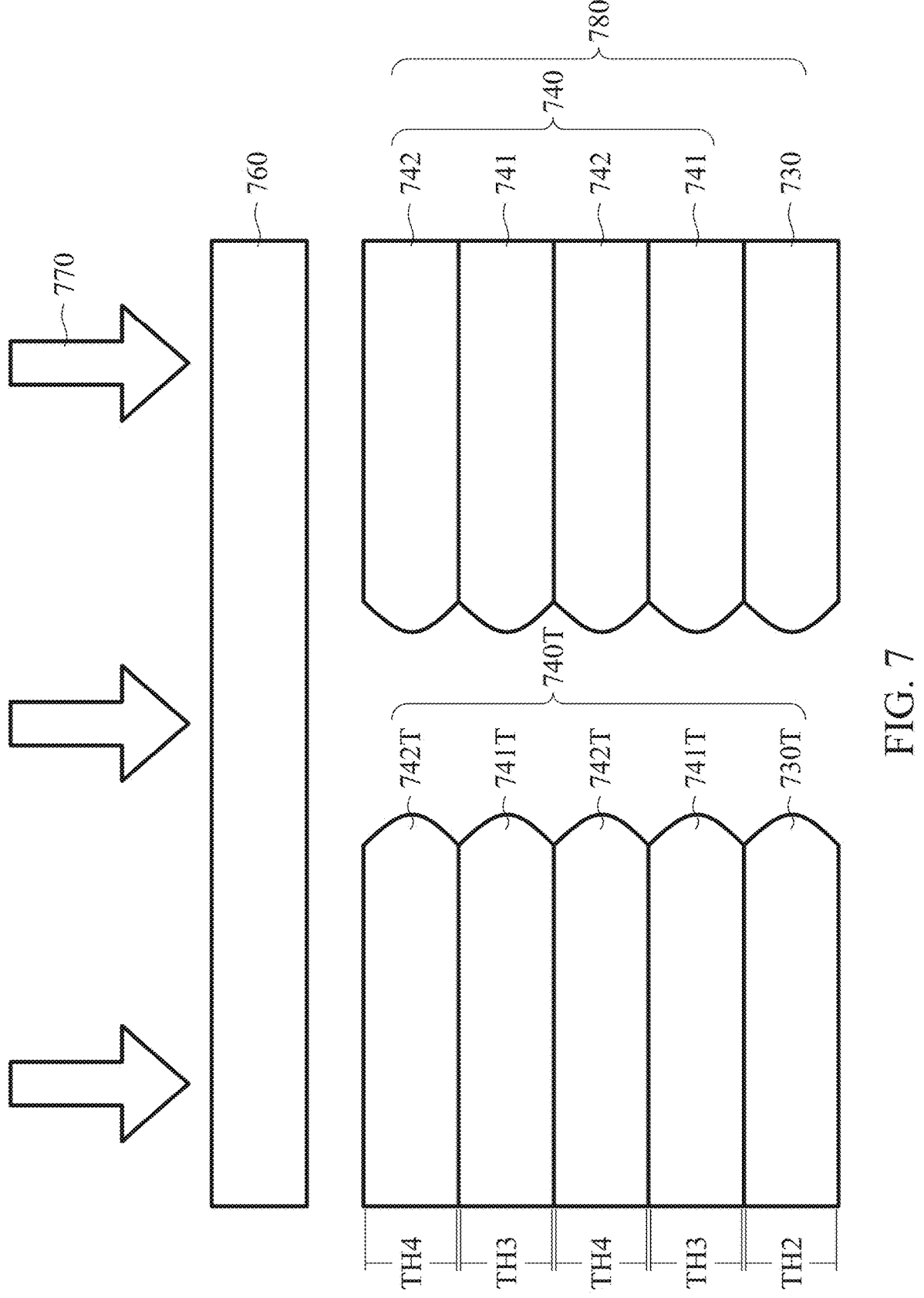
FIG. 7 is a schematic diagram illustrating removal of a fixed layer during a producing process according to an embodiment of the present disclosure.

Referring to FIG. 1 and FIG. 7, after operation 150, the fixed layer 760 is irradiated with light 770, and the optical filter 780 is separated from the fixed layer 760, as shown in operation 160. As mentioned above, the adhesive film of the fixed layer 760 has the photolytic viscosity, so the adhesive force of the adhesive film decreases after irradiates the light 770, so that the optical filter 780 is separated from the fixed layer 760. For example, irradiation conditions may be irradiating the fixed layer 760 with the light 770 having a wavelength of 365 nm and a power density of 460 mJ/cm$^2$ for 20 seconds. If the fixed layer 760 is not irradiated with the light 770, the optical filter 780 cannot be transfer printed and bonded to the miniaturized element.

Please refer to FIG. 1 and FIG. 4 again. In some other embodiments, after the base layer 430 and the dielectric stack layer 440 are sequentially deposited, another base layer may be optionally deposited on the dielectric stack layer 440, so that both sides of the dielectric stack layer 440 are provided with the base layers 430. Preferably, the two base layers 430 have the same thicknesses and materials to improve the flatness of the optical filter.

Figure 8:
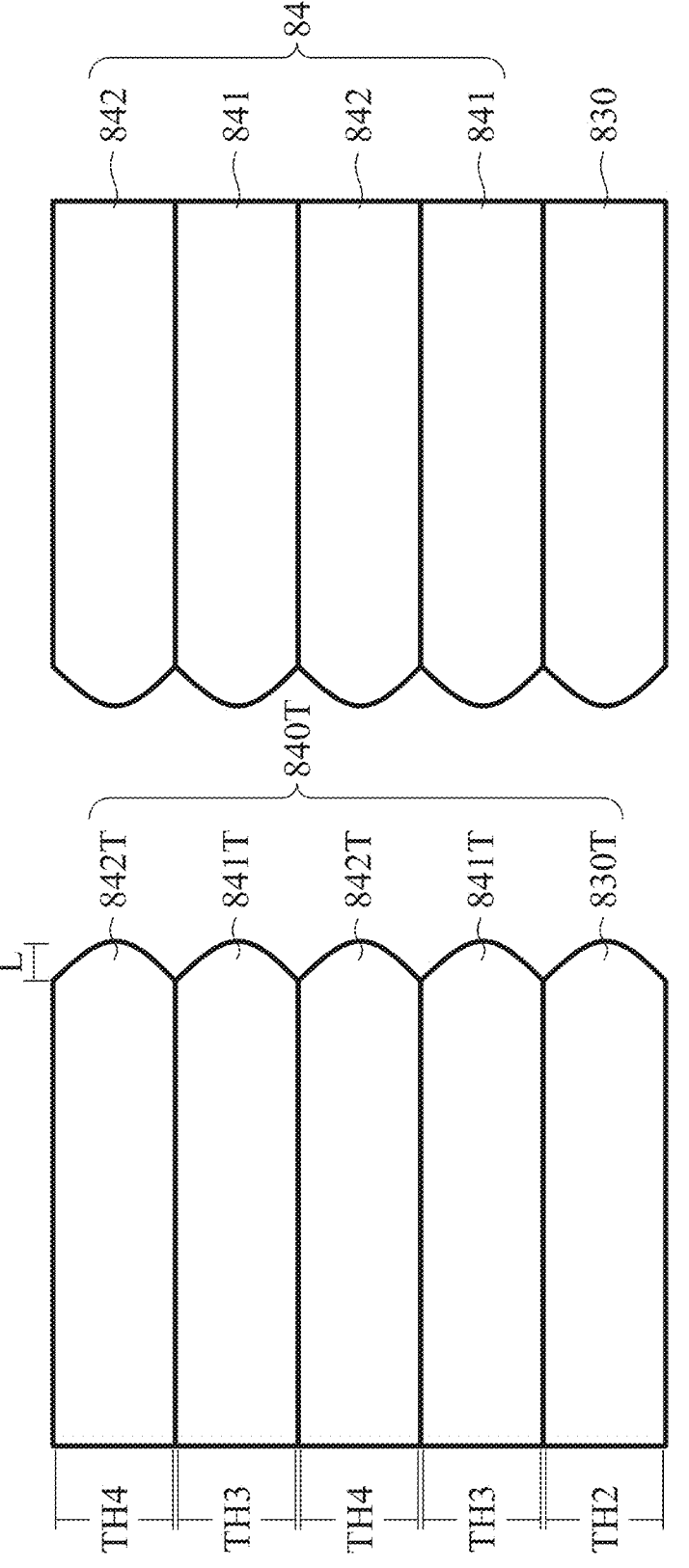
FIG. 8 is a schematic diagram illustrating an optical filter according to an embodiment of the present disclosure.

Another aspect of the present disclosure provides an optical filter. The optical filter is made by the method mentioned above. Referring to FIG. 8, an optical filter 880 includes a base layer 830 and a dielectric stack layer 840, and the dielectric stack layer 840 extends outward to form a solidified structure 840T with a length L less than 15 μm.

Incidentally, stress generated during the deposition of the plating layer may include intrinsic stress of the plating layer and thermal stress between the plating layer and the substrate. The intrinsic stress may include tensile stress and compressive stress. Reaction force between the tensile stress of the plating layer and the substrate causes the plating layer to bend inward to form a concave surface. In another aspect, reaction force between the compressive stress of the plating layer and the substrate causes the plating layer to bend outward to form a convex surface. The flatness of the optical filter 880 is improved by reducing or eliminating the intrinsic stress and the thermal stress as detailed below.

Please refer to FIG. 8 again. The first dielectric layers 841 and the second dielectric layers 842 may be alternately stacked, that is, one provides the tensile stress and the other provides the compressive stress to eliminate the intrinsic stress, so the flatness of the optical filter 880 is improved. In addition, the optical filter 880 excludes the substrate, so the thermal stress and force between the optical filter 880 and the substrate do not exist, and deformation caused thereby disappears, so the flatness of the optical filter 880 is improved. In some embodiments (not shown), the optical filter further includes another base layer, that is, the dielectric stack layer is interposed between the two base layers to improve the flatness of the optical filter through symmetry of the two base layers.

In addition to improving the flatness of the optical filter 880, lack of the substrate may also reduce the volume of the optical filter 880. In another aspect, the above-mentioned solidified structure 840T may provide a strengthening effect of an edge structure of the optical filter 880. Therefore, the optical filter of the present disclosure has advantages of high flatness, miniaturized volume and high strength, so it is suitable for bonding to the miniaturized optical element by transfer printing to realize automatic mass production of the miniaturized optical elements to enlarge output and save time.

Further, in the producing process, the optical filter 880 is not cut, and the structure around its edges (i.e., the solidified structure 840T) is complete and undamaged, so the solidified structure 840T can improve the structural strength of the optical filter 880, so that the optical filter 880 will not be damaged by external forces of clamping and bonding during the subsequent assembly processes.

In some application examples, in the subsequent assembly processes, since the optical filter 880 of the present disclosure has the miniaturized volume (i.e. substrate-free), miniaturized area, high flatness and high strength (the strength effect provided by the solidified structure 840T), so it is suitable for bonding to the miniaturized element by transfer printing to realize the automatic mass production of the miniaturized elements to enlarge the output and save the time.

Specifically, during the transfer printing process, the optical filter 880 is regularly affixed on the fixed layer (specifically, such as an optical adhesive layer), and a low-viscosity adhesive layer is affixed on the other side of the optical filter 880 (i.e., one side thereof not adhered to the fixed layer), and a release film then covers outside of the optical adhesive layer (another side relative to the optical filter 880), and it is placed on a transfer printing device to transfer print and bond the optical filter 880 onto the miniaturized element.

Furthermore, the miniaturized-volume optical filter of the present disclosure can be applied in the transfer printing method, while the traditional large-volume optical filter can only be bonded by manual dispensing, which cannot be automated and continuous production and has disadvantages of difficult alignment and glue overflow. Secondly, the high flatness of the optical filter of the present disclosure can avoid warp during transfer printing and bonding. Furthermore, the high-strength edge structure of the optical filter of the present disclosure can prevent the optical filter from being damaged due to the external forces of clamping and bonding. Accordingly, the optical filter of the present disclosure can realize the automatic mass production of the miniaturized elements.

The following examples are used to illustrate the application of the present disclosure, but it is not intended to limit the present disclosure. Anyone skilled in the art can make various changes and modifications without departing from the spirit and scope of the present disclosure.

Preparation of Optical Filters

Example 1

A glass substrate with a thickness of 1 mm to 2 mm was grooved using laser light to form trenches with a width of 0.1 mm to 0.2 mm and a depth of 0.1 mm to 0.4 mm. The trenches were parallel and perpendicular to each other to divide the substrate into rectangular regions (the area was $0.7 \times 0.7$ mm$^2$). A thermal evaporation deposition process at 150° C. without turning on an ion source was performed to form sodium hexafluoroaluminate with a thickness of 80 nm on the glass substrate.

Next, the ion source was turned on, and a voltage and a current were set to 600V and 600 mA, respectively, and a silicon dioxide layer (acted as a base layer) with a thickness of 4 μm to 5 μm and a dielectric stack layer were sequentially deposited on the sodium hexafluoroaluminate layer by ion-beam assisted evaporation. The dielectric stack layer was composed of silicon dioxide layers with a low refractive index (e.g., 1.4) and tantalum pentoxide (Ta$_2$O$_5$) layers with a high refractive index (e.g., 2.0) stacked alternately, of which the layer in contact with the base layer was the silicon dioxide layer, and a thickness of the dielectric stack layer was 33 nm, and a number of the layers was 4 layers.

The silicon dioxide layers and the tantalum pentoxide layers extended outward to form a plurality of protrusions. The protrusions formed a solidified structure, and a length of the solidified structure was greater than 0 μm and less than 15 μm.

Subsequently, an UV photolytic adhesive tape was affixed on outside of the dielectric stack layer (one side away from the base layer), and it was then moved to pure water at room temperature, and vibrated with ultrasonic waves for 6 minutes, and soaked for 2 hours, so that the pure water completely dissolved the sodium hexafluoroaluminate layer, and the prototype optical filters were released from the substrate. Next, the adhesive tape was irradiated with UV light with a wavelength of 365 nm to release the optical filters from the adhesive tape. Subsequently, evaluation tests were performed on the optical filters.

Example 2 and Comparative Examples 1 to 2

Example 2 and Comparative Examples 1 to 2 were prepared in the same manner as in Example 1 to prepare the optical filters. The difference was that, in Example 2, after the base layer and the dielectric stack layer were sequentially deposited, another base layer identical to the previous base layer was deposited on the dielectric stack layer, that is, both sides of the dielectric stack layer were provided with the base layers.

In Comparative Examples 1 and 2, the glass substrate was not grooved to form trenches. In Comparative Example 1, after the base layer and the dielectric stack layer were deposited, a composite material layer stacked by the glass substrate, the sacrificial layer, the base layer and the dielectric stack layer was cut into rectangular blocks with the same areas as the rectangular regions of Example 1. Next, a voltage of an ion source was set to 1,100V and a current thereof was set to 1,100 mA. In addition, in Comparative Example 2, no sacrificial layer was deposited on the glass substrate, and a base layer was directly deposited on the glass substrate, and a tape was affixed on outside of the glass substrate (i.e., one side of the glass substrate away from the base layer). Specific conditions and test results of Examples 1 to 2 and Comparative Examples 1 to 2 are listed in Table 1 below and shown in FIG. 9 (top view) to FIG. 10 (top view).

Evaluation Methods

1. Structural Integrity

An electron microscope was utilized to observe structural appearance around the optical filter to evaluate structural integrity of the optical filter by the appearance.

O: Structural was complete and undamaged

X: Structure was incomplete and damaged

2. Flatness

A direction perpendicular to the base layer and the dielectric stack layer was taken as a direction of measuring a height, and a white light interferometer was used to measure a radius of curvature of the optical filter and a height difference between a highest point and a lowest point on a surface of the rectangular region, and the measured radius of curvature and the height difference were used to evaluate the flatness of the optical filter. When the radius of curvature was larger and the height difference was smaller, the optical filter had better flatness.

3. Thickness

After an image of the sacrificial layer, the base layer, and the dielectric stack layer was captured using a charge-coupled device (CCD), a thickness measurement was performed on the image.

TABLE 1

| | | Example | | Comparative Example | |
|---|---|---|---|---|---|
| | | 1 | 2 | 1 | 2 |
| Process | Grooving substrate to form trenches | With | With | Without | Without |
| | Using sacrificial layer | With | With | With | Without |
| | Performing cutting treatment | Without | Without | With | With |
| Structure of optical filter | Substrate | Without | Without | Without | Glass |
| | Sacrificial layer | Without | Without | Without | Without |
| | Base layer | Silicon dioxide layer | | | |
| | Dielectric stack layer — Dielectric layer with low refractive index | Silicon dioxide layer | | | |

TABLE 1-continued

| | | | Example | | Comparative Example | |
|---|---|---|---|---|---|---|
| | | | 1 | 2 | 1 | 2 |
| | | Dielectric layer with high refractive index | tantalum pentoxide layer | | | |
| | | Base layer | Without | Silicon dioxide layer | Without | Without |
| Evaluation results | | Structural Integrity | ○ | ○ | X | X |
| | Flatness | Radius of curvature (mm) | 19.98 | 537.58 | 17.89 | 200~350 |
| | | Height difference (μm) | 2.1 | 0.175 | 2.3 | 0.25~0.5 |

Figure 9:
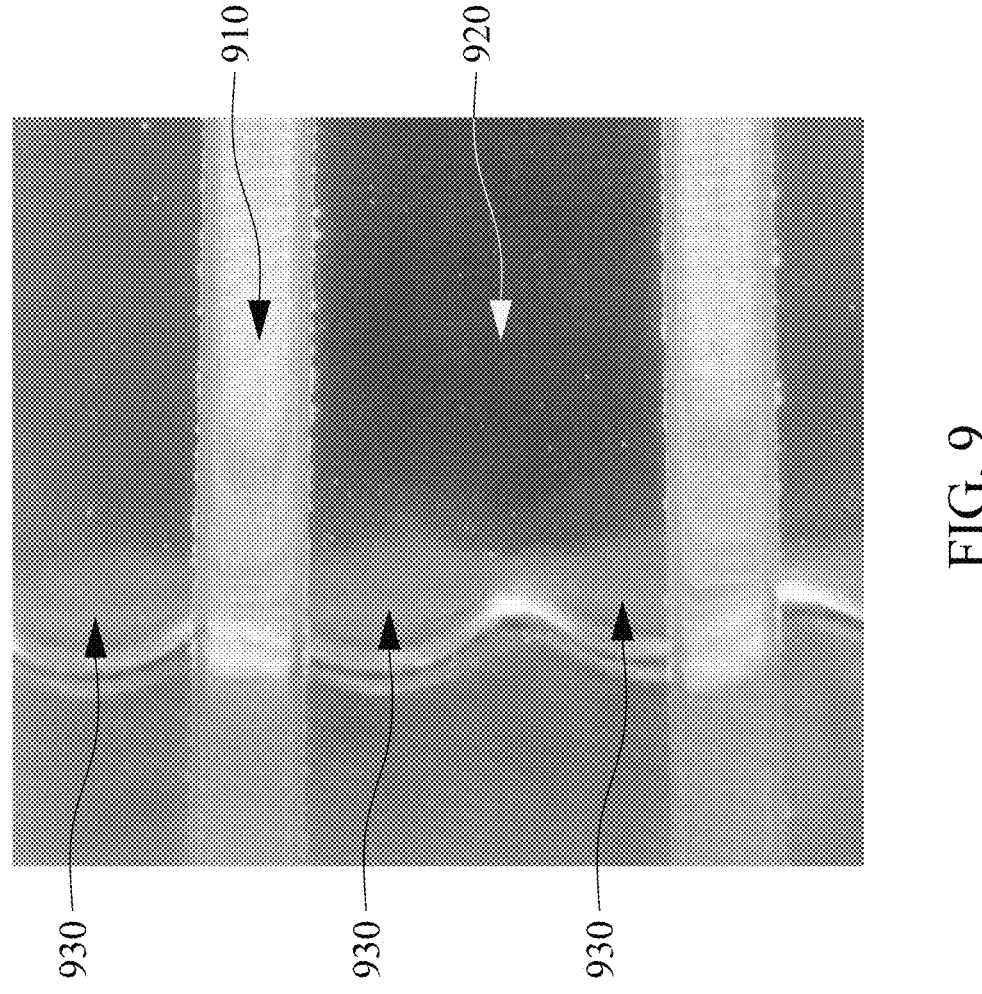
FIG. 9 is an image captured by a CCD of a stack of a substrate, a sacrificial layer, a base layer, a dielectric stack layer and a fixed layer according to Example 1 of the present disclosure.
Figure 10:
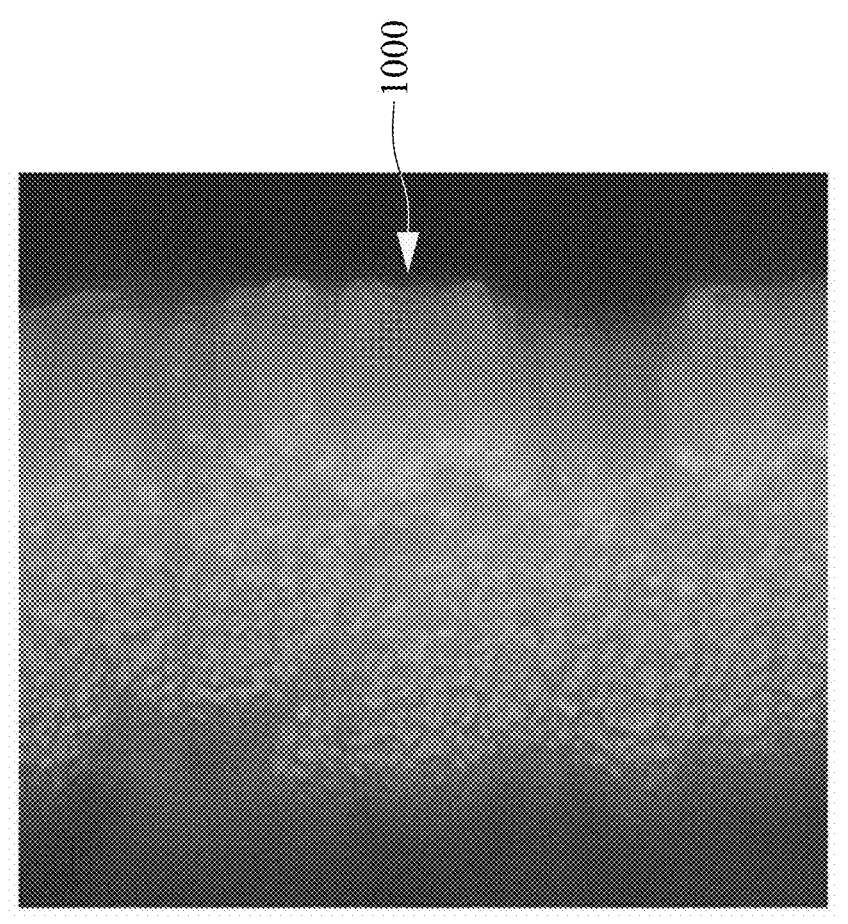
FIG. 10 is an electron micrograph of an optical filter according to an embodiment of the present disclosure.

Please refer to Table 1, the method of producing the optical filter of Examples 1 to 2 was depositing the sacrificial layer, the base layer and the dielectric stack layer on the substrate with trenches, and removing the sacrificial layer to obtain the substrate-free optical filter with the solidified structure. Referring to FIG. 9 (top view), in Example 1, the image of the substrate with the trenches 910 (as the trench 511 shown in FIG. 5), the sacrificial layer, the base layer, the dielectric stack layer and the stack 920 (as the stack 500 shown in FIG. 5) of the fixed layer captured by the CCD from top to bottom showed that the length (as the length L shown in FIG. 4) of the solidified structure (as shown by an arrow 930 in FIG. 9, as the solidified structure 540T shown in FIG. 5) was less than 15 μm, which could enhance the structural strength of the optical filter (as the optical filter 880 shown in FIG. 8), and since the prototype optical filter was not cut, the structural integrity was retained (as shown by an arrow 1000 in FIG. 10, as the solidified structure 840T shown in FIG. 8). In addition, the volume of the substrate-free optical filter was miniaturized, so it was suitable for the processes of transfer printing and bonding. Therefore, the optical filters of Examples 1 to 2 could be applied to the automatic producing processes of the miniaturized elements.

However, in Comparative Example 1, after the composite material layer was deposited, it was cut to produce the optical filter, so the structure around edges of the optical filter was damaged. This damaged structure easily leaded to cracking of the optical filter during subsequent assembly. In addition, in Comparative Example 2, no sacrificial layer was thermal evaporation deposited, and the substrate was not removed, so the volume of the produced optical filter was large, and the stress was left in the optical filter, which was prone to warp. Therefore, the optical filters of Comparative Examples 1 to 2 could not be applied to the automatic producing processes of the miniaturized elements.

To sum up, in the optical filter and the method of producing the same of the present disclosure, the sacrificial layer is deposited by the thermal evaporation deposition process, and the base layer and the dielectric stack layer are deposited on the substrate having the trench with the specific width, so that the dielectric stack layer extends outward to form the solidified structure with the specific length. Next, the fixed layer is affixed on the dielectric stack layer, and the sacrificial layer is removed with the solvent to remove the substrate. Accordingly, the structural strength and the flatness of the produced optical filter are improved, and the volume thereof is reduced, so that it can be applied to the automatic producing processes of the miniaturized elements.

Although the present disclosure has been disclosed in the above embodiments, it is not intended to limit the present disclosure, and it is to be understood that those skilled in the art can make various changes and modifications without departing from the spirit and scope of the present disclosure. The scope of protection of the present disclosure is subject to the definition of the scope of claims.

What is claimed is:

1. A method of producing an optical filter, comprising:
   providing a substrate having at least one trench, wherein a width of the at least one trench is not less than 0.1 mm, and the at least one trench divides the substrate into at least two regions; and
   performing a thermal evaporation deposition process on the substrate to form a sacrificial layer on the at least two regions;
   after performing the thermal evaporation deposition process, performing a deposition process on the sacrificial layer to sequentially deposit a first base layer and a dielectric stack layer on the sacrificial layer in the at least two regions, wherein the deposition process comprises an ion beam-assisted evaporation, and the first base layer and the dielectric stack layer extend outward to form a solidified structure, and a length of the solidified structure is less than 15 μm, and the length of the solidified structure is defined as the longest length of the solidified structure measured in a direction parallel to the width of the at least one trench based on an inner wall of the at least one trench as a starting point of the solidified structure;
   affixing a fixed layer on the dielectric stack layer in the at least two regions, so that the dielectric stack layer is fixed on the fixed layer to form at least one prototype optical filter on the sacrificial layer in the at least two regions;
   removing the sacrificial layer with a solvent to separate the at least one prototype optical filter from the substrate, wherein a material of the sacrificial layer is water-soluble; and
   irradiating the fixed layer with light to separate the optical filter from the fixed layer.

2. The method of producing the optical filter of claim 1, wherein a depth of the at least one trench is not less than 0.1 mm.

3. The method of producing the optical filter of claim 1, wherein when performing the thermal evaporation deposition process, a temperature of the substrate is set at 140° C. to 160° C.

4. The method of producing the optical filter of claim 1, wherein the thermal evaporation deposition process is performed without using an ion beam.

5. The method of producing the optical filter of claim 1, wherein an included angle between a deposition direction of the thermal evaporation deposition process and a normal direction of a surface of the sacrificial layer is 10 degrees to 40 degrees.

6. The method of producing the optical filter of claim 1, wherein a voltage and a current of the ion beam-assisted evaporation are 500V to 700V and 500 mA to 700 mA, respectively.

7. The method of producing the optical filter of claim 1, wherein an included angle between a deposition direction of the deposition process and a normal direction of a surface of the first base layer is 10 degrees to 40 degrees.

8. The method of producing the optical filter of claim 1, wherein an included angle between a deposition direction of the deposition process and a normal direction of a surface of the dielectric stack layer is 10 degrees to 40 degrees.

9. The method of producing the optical filter of claim 1, wherein the dielectric stack layer comprises:

at least one first dielectric layer, and at least one second dielectric layer alternately stacked with the at least one first dielectric layer, wherein a first refractive index of the at least one first dielectric layer is not equal to a second refractive index of the at least one second dielectric layer.

10. The method of producing the optical filter of claim 1, wherein a thickness of the first base layer is not less than 3 μm.

11. The method of producing the optical filter of claim 1, wherein the material of the sacrificial layer comprises a salt of hexafluoroaluminic acid, and the solvent comprises water.

12. The method of producing the optical filter of claim 1, wherein before affixing the fixed layer on the dielectric stack layer, the method further comprises depositing a second base layer on the dielectric stack layer.

* * * * *